INVENTORS.
Harold A. Walters
BY Wayne C. Beach

AGENT

United States Patent Office 3,488,714
Patented Jan. 6, 1970

1

3,488,714
FORMED LAMINATE STRUCTURE AND
METHOD OF PREPARATION
Harold A. Walters, Beaverton, and Wayne C. Beach,
Midland, Mich., assignors to The Dow Chemical Company, Midland, Mich., a corporation of Delaware
Filed Sept. 19, 1966, Ser. No. 580,254
Int. Cl. B32b 5/18, 31/26; B29c 17/04
U.S. Cl. 161—161
12 Claims

ABSTRACT OF THE DISCLOSURE

This invention relates to a heat formable laminate comprising a first solid surface layer of a synthetic resinous material, a second solid surface layer of a synthetic resinous material, the first and second layers being thermoformable, a central layer comprising a plurality of thermoplastic resinous particles having a generally spherical shape and having encapsulated therein as a distinct and separate phase a volatile fluid raising agent which becomes gaseous at a temperature below the softening point of the spherical particles, the thermoplastic resinous particles being securely adhered to the first and second surface layers by means of a thermoplastic resinous matrix, the thermoplastic resinous matrix being present in sufficient quantity that a coherent body is obtained when the central layer is heated to a temperature sufficient to cause the spherical particles to expand. The invention also includes a method of heating the central layer to cause the particles to expand.

---

This invention relates to the improved shaped laminate structure and a method of shaping the laminate structure, and more particularly relates to the method for the preparation of thermoplastic resinous articles having a foamed or expanded core.

Oftentimes it is desirable to prepare shaped articles or thermoplastic resinous materials of light weight having an impermeable gloss surface. Typical applications for such shaped articles are cups, trays, and the like for comestibles such as food stuffs including apples, oranges, meats, onions, tomatoes, and the like. A wide variety of other materials are beneficially packaged or contained in lightweight shaped articles. The formation of such shaped articles oftentimes is rather difficult and employs such techniques as the preparation of a foam sheet laminate wherein a foamed resinous core is employed having laminated to one or both major faces a solid formable thermoplastic resinous film. Such film is then heated to a heat forming temperature and formed by means such as vacuum forming or pressure forming into the desired configuration. Alternate means involve forming of a shaped article and subsequent lamination of a preformed film to one or both surfaces of the article. There is a considerable disadvantage when a foamed sheet must be formed by heat fabrication techniques in that the sheet must be heated relatively slowly in order to avoid overheating of the thermoplastic surfaces and collapse of the cells. A significant disadvantage exists when a foamed sheet or foamed material must be shipped because of the relatively high bulk of the article.

It would be desirable to have available a method for the preparation of foam plastic sheet articles having a relatively solid surface without the necessity of having a foamed material until the article was formed.

It would be further advantageous if there were available a method which would permit a forming of a shaped article having a thin cellular core and solid surfaces which offered optimum economy in shipping.

2

It would be beneficial if there were available a method for the formation of sheet articles having solid thermoplastic resinous surfaces and a foamed core of controllable variable thickness.

It would be further advantageous to have available a shaped laminate article having a foamed core of relatively uniform small cell size firmly adhered to solid thermoplastic resinous skins.

These benefits and other advantages are achieved utilizing the method of the present invention which comprises providing a laminate having a first surface of a heat formable synthetic resinous thermoplastic material, a core comprising a plurality of thermoplastic resinous particles having a generally spherical shape and having encapsulated therein as a distinct and separate liquid phase a volatile fluid raising agent which becomes gaseous at a temperature below the softening point of the spherical particles, the thermoplastic resinous particles being securely adhered to the solid resinous material, heating the thermoplastic resinous material of the first surface to a heat formable temperature sufficiently high to heat plastify the thermoplastic resinous polymeric particles and volatilize the volatile fluid raising agent to expand the particles to a diameter substantially greater than the original diameter while heat forming the composite structure to a desired configuration while maintaining the cellular nature thereof.

Also contemplated within the scope of the present invention is a heat formable laminate comprising a first solid surface layer of a synthetic resinous material, a second solid surface layer of a synthetic resinous material, the first and second layers being thermoformable, a central layer comprising a plurality of thermoplastic resinous particles having a generally spherical shape and having encapsulated therein as a distinct and separate phase a volatile fluid raising agent which becomes gaseous at a temperature below the softening point of the spherical particles, the thermoplastic resinous particles being securely adhered to the first and second surface layers by means of a thermoplastic resinous matrix, the thermoplastic resinous matrix being present in sufficient quantity that a coherent body is obtained when the central layer is heated to a temperature sufficient to cause the spherical particles to expand.

Further features and advantages of the present invention will become more apparent from the following specification taken in connection with the drawing wherein.

Figure 1:
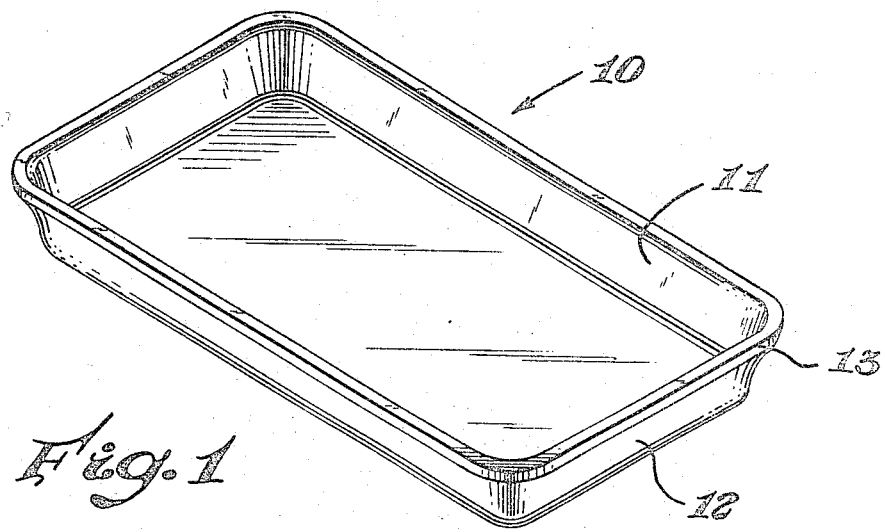
FIGURE 1 depicts a view of a shaped article in accordance with the present invention.

In FIGURE 1 there is illustrated a shaped article generally designated by the reference numeral 10. The article 10 has a first surface layer 11 comprised of a non-expanded or solid heat formed synthetic resinous thermoplastic material, a second surface 12, a non-expanded solid heat formed synthetic resinous thermoplastic material and a core 13 comprised of a plurality of expanded cellular particles of a synthetic thermoplastic resinous material adhered to the layers 11 and 12.

Figure 2:
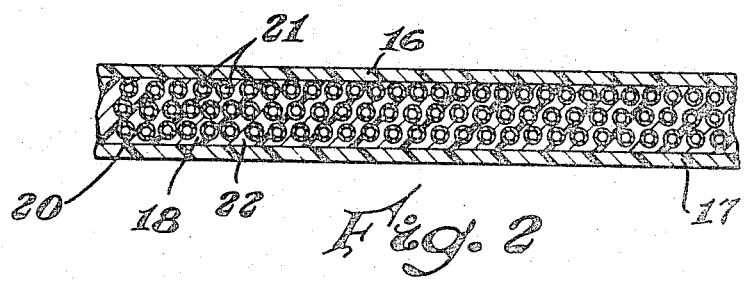
FIGURE 2 is a schematic enlarged representation of a cross sectional view of a formable thermoplastic resinous sheet having a foamable core.

In FIGURE 2 there is illustrated schematically an enlarged cross-sectional view of a laminate comprising a first surface 16 of a solid non-expandable heat formable synthetic thermoplastic resinous material, a second surface layer of a non-expanded heat formable synthetic thermoplastic resinous material 17, a core generally designated by the reference numeral 18, the core comprising a plurality of generally spherical heat plasticizable synthetic resinous particles 20 having encapsulated therein as a distinct and separate liquid phase a volatile fluid foaming agent 21. The particles 20 are adhered to each other and to the layers 16 and 17 by a thermoplastic synthetic resinous binder 22.

Figure 3:
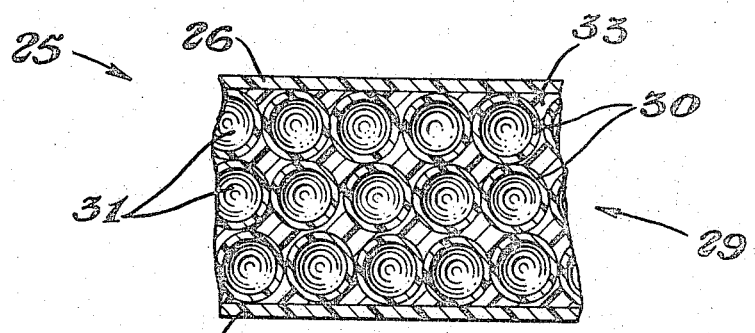
FIGURE 3 is a schematic cross sectional representation of a portion of a shaped composite article in accordance with the invention.

In FIGURE 3 there is schematically illustrated a greatly enlarged view of a section of a shaped laminated article in accordance with the invention generally designated by the reference numeral 25. The article 25 comprises a first solid non-expanded synthetic resinous thermoplastic sheet or film 26, a second heat formed synthetic resinous thermoplastic film or sheet 27 remotely disposed from the film 26. A core generally designated by the reference numeral 29 is disposed between the formed sheets 26 and 27. The core 29 comprises a plurality of essentially monocellular expanded synthetic thermoplastic resinous particles 30 each defining an internal gas filled space 31, the particles 30 are adhered to each other and to the surface layers 26 and 27 by means of a synthetic resinous thermoplastic binder 33.

A wide variety of heat formable thermoplastic resinous materials are readily employed for the surface skins or outer layers of formable film in accordance with the invention. Typical materials which are suitable are:

Polytetrafluoroethylene
FEP (Fluorinated ethylene-propylene copolymer)
Polyvinylidenefluoride
Polychlorotrifluoroethylene
Polybutyl acrylate
Polyvinyl acetate
Ethyl cellulose
Polyformaldehyde
Polyisobutyl methacrylate
Polybutyl methacrylate
Polymethyl acrylate
Polypropyl methacrylate
Polyethyl methacrylate
Polymethyl methacrylate
Cellulose acetate
Cellulose propionate
Cellulose acetate-butyrate
Cellulose nitrate
Polyvinyl butyral
Polypropylene
Low density polyethylene (branched)
Polyisobutylene
Natural rubber
Perbunan
Polybutadiene
Nylon (condensation copolymer of hexamethylenediamine and adipic acid)
Polyvinyl chloroacetate
Polyvinylchloride
Polyethylene (high density linear)
A copolymer of 67 parts by weight methyl methacrylate and 33 parts by weight styrene
A copolymer of 85 parts by weight vinyl chloride and 15 parts by weight vinylidene chloride
Poly-α-methylstyrene
A copolymer of 60 parts by weight styrene and 40 parts by weight butadiene
Neoprene
A copolymer of 70 parts by weight styrene and 30 parts by weight acrylonitrile
Polycarbonate resin
Polystyrene
A copolymer of 85 parts by weight vinylidene chloride and 15 parts by weight vinyl chloride
Polydichlorostyrene The expandable thermoplastic resinous particles which are suitable for practice of the present invention are described in Belgian Patent 641,711 issued June 23, 1964. The Belgian patent also describes binder or adhesive materials which are satisfactory for preparing expandable coatings which may be employed in the practice of the present invention. The critical limitation of the binder is that it must adhere to the expandable particles if the nature of the expandable particles is not such that they adhere to the surface layers and to each other. The binder must be a termoplastic material at the time when the composite sheets are formed.

The invention is further illustrated but not limited by the following examples:

EXAMPLE 1

A foamable coating composition is prepared by admixing an aqueous dispersion of expandable microspheres (50.6 weight percent expandable microspheres). The microspheres are prepared by polymerization of 95 weight percent methyl methacrylate, 5 weight percent acrylonitrile containing 36.9 weight percent neopentane based on the weight of the polymer with a latex which is 46 weight percent solids, the remainder being water, of a polymer of 40 weight percent styrene and 60 weight percent 2-ethyl hexyl acrylate in 10 weight percent aqueous solution of hydroxyethylcellulose. The microspheres and latex of hydroxyethylcellulose are combined in a proportion of 87:125:12 parts by weight. The resultant coating composition is applied to a 5 mil thick biaxially oriented polystyrene film employing a wire wound rod. Three coats were applied to provide a laminate having a thickness of about 11 mils. One coat of the composition is applied to a 2 mil thick biaxially oriented polystyrene film. The coated polystyrene film is placed in face to face engagement with the coated faces adjacent and placed in a platen press having platens at a temperature of about 55° C., and sufficient pressure applied to cause bonding of the two sheets to each other. The resultant composite sheet is subsequently placed in a vacuum forming apparatus and heated to a temperature sufficient to soften the polystyrene film and cause the expansible coating material to expand. The sheet is vacuum formed into a meat tray. The resultant meat tray has a smooth inner and outer surface, a foam layer of about 70 mils in thickness disposed therebetween and no tendency was observed for either the 5 mil or 2 mil polystyrene sheets to delaminate from the foamed coating.

EXAMPLE 2

A foamable coating composition is prepared by admixing 77.6 parts by weight of an aqueous dispersion of foamable microspheres. The foamable microspheres are 70 weight percent methyl methacrylate, 30 weight percent methyl acrylate (containing 35 weight percent neopentane based on the weight of the polymer). The aqueous dispersion is 70.4 weight percent microspheres and blowing agent dispersed in 207 parts by weight of water. Eighty parts by weight of an aqueous binder composition is employed. The binder composition is a 50 weight percent solids aqueous dispersion of a polymer of 60 weight percent styrene and 40 weight percent butadiene. 16.2 parts by weight of a 5 weight percent aqueous dispersion of the sodium salt of polyacrylic acid is added as a thickener and as a dispersing agent, 2.7 parts by weight of a 25 weight percent aqueous dispersion of sodium dodecyl diphenyl oxide disulfonate. Two polymethyl methacrylate films having a thickness of about 3 mils are coated with three coats of the coating composition applied with a wire wound rod. The coating is air dried between coats. One sheet of 2 mil thick polymethyl methacrylate film is coated with one coat on each side and the three sheets assembled to form a sandwich, the double coated sheet being disposed in the center with coated faces adjacent. The sandwich is then pressed in a platen press at a temperature of about 58° C. to cause the sheets to bond together. The sheets are subsequently vacuum formed in the manner of Example 1 to provide a coherent insulated meat tray.

EXAMPLE 3

A coating composition is prepared by admixing 80 parts by weight of 50 percent solids aqueous dispersion of a polymer of 60 weight percent styrene and 40 weight percent butadiene, 2.7 parts by weight of sodium dodecyl diphenyl oxide disulfonate (as a 25 weight percent aqueous solution) and 50 parts by weight of an aqueous dispersion of expandable microspheres (70.4 weight percent expandable microspheres). The expandable microspheres are formed of a polymer of 95 weight percent methyl methacrylate, 5 weight percent acrylonitrile and contain 35 weight percent neopentane based on the weight of the polymer (17.3 parts of water and 6.2 parts by weight of 5 weight percent solution of sodium salt of polyacrylic acid). In a manner similar to Example 2, sheets of 5 mil thick polyethylene are formed into a 5 layer laminate (two foam layers, three polyethylene layers). The resultant laminate is subsequently simultaneously foamed and thermoformed. The various laminates adhere well.

EXAMPLE 4

A three layer laminate is prepared in the manner of Example 1 employing 5 mil thick ethyl cellulose sheets and a coating composition which is prepared from 90 parts by weight of an aqueous dispersion of expandable microspheres, the microspheres having a polymer shell prepared from 60 weight percent styrene and 40 weight percent acrylonitrile. The microspheres contain 35 weight percent neopentane based on the weight of the polymer shell. The microsphere dispersion is 70 weight percent expandable microspheres, 30.7 parts by weight of water, 228 parts by weight of an aqueous film forming dispersion of a polymer of 85 weight percent vinylidene chloride, 10 weight percent butyl acrylate and 5 weight percent acrylonitrile. The aqueous dispersion is 50 weight percent solids and 5 parts by weight of a 10 weight percent solution of hydroxyethylcellulose. The resultant three layer laminate is thermoformed in the manner of Example 1 and commensurate results are achieved.

EXAMPLE 5

A five layer laminate employing 3-4 mil sheets of polyvinyl acetate is prepared in a manner generally similar to that of Example 2 employing as a foamable coating composition a mixture of 106 parts by weight of an aqueous dispersion which is 75 weight percent foamable microspheres. The foamable microspheres have a foamable shell prepared from 80 weight percent vinylidene chloride and 20 weight percent acrylonitrile and contain 35 weight percent neopentane based on the weight of the polymer shell, 51 parts by weight of water, 100 parts by weight of an aqueous dispersion of a film forming copolymer of 60 weight percent styrene and 40 weight percent butadiene which is 50 weight percent solids and 5 parts by weight of a 5 weight percent solution of the sodium salt of polyacrylic acid. The resultant laminate is readily heat formed with simultaneous forming and shaping and no significant tendency to delaminate is observed.

EXAMPLE 6

A five layer laminate is prepared employing the general procedure of Example 2 utilizing 7.5 mil thick sheets of a polymer of 67 weight percent methyl methacrylate and 33 weight percent styrene. The foamable coating composition employed consists of 94 parts by weight of an aqueous dispersion of foamable microspheres. The foamable microspheres have a polymer shell of 80 weight percent methyl methacrylate and 20 weight percent methyl acrylate containing encapsulated therein 35 weight percent neopentane based on the weight of the polymer shell. The dispersion is 75 percent expandable microspheres and the remainder water, 140 parts by weight of a film forming latex prepared from 60 weight percent styrene and 40 weight percent butadiene, the latex being 50 weight percent solids and 7.8 parts b weight of 5 weight percent aqueous solution of the sodium salt of polyacrylic acid. The resultant laminate forms and foams in the manner similar to that of the sheet of Example 2.

EXAMPLE 7

The procedure of Example 2 is employed to form a 5 layer laminate employing three sheets of a copolymer prepared from 85 weight percent vinylidene chloride and 15 weight percent vinyl chloride. The sheets have a thickness of about 3.7 mils. The foamable coating composition employed uses 106.6 parts by weight of wet expandable microspheres. The expandable microspheres have a polymer shell of 80 weight percent vinlidene chloride and 20 weight percent acrylonitrile and contain 35 weight percent neopentane based on the weight of the polymer shell. The said microspheres contain 25 percent water (43.4 parts by weight water), 160 parts by weight of a film forming latex, the latex polymer being a polymer of 85 weight percent vinylidene chloride, 10 weight percent butyl acrylate, 5 weight percent acrylonitrile. The latex is 50 weight percent solids and 10 parts by weight of a 10 weight percent solution of hydroxyethylcellulose. The resultant laminate foams and forms as the laminate of Example 2.

EXAMPLE 8

Employing the procedure of Example 2, a five layer laminate is prepared employing 2.5 mil thick sheets of a polymer of 70 weight percent system styrene and 30 weight percent butadiene. The foamable coating composition is prepared from 94 parts by weight of wet expandable microspheres. The microspheres having a polymer shell 80 weight percent prepared from methyl methacrylate, 20 weight percent methyl acrylate and contain 35 weight percent neopentane based on the weight of the polymer shell. The wet microspheres contain 25 weight percent water (36.4 parts by weight of water), 194.6 parts by weight of a film forming latex of a polymer prepared from 85 weight percent vinylidine chloride, 10 weight percent butyl acrylate and 5 weight percent acrylonitrile. The latex is 50 weight percent polymer solids weight percent butyl acrylate and 5 weight percent acrylonitrile. The latex is 50 weight percent polymer solids and 10 parts by weight of a 10 weight percent solution of hydroxyethylcellulose. The resultant laminate heat forms and foams readily in vacuum forming apparatus to provide a coherent laminate of excellent structural strength.

What is claimed is:

1. A method of forming a composite thermoplastic article, the method comprising providing a laminate, the laminate having a first surface of a heat formable synthetic resinous thermoplastic material, a core, the core comprising a plurality of thermoplastic resinous particles, the particles having a generally spherical shape and having encapsulated therein as a distinct and separate liquid phase a volatile fluid raising agent which becomes gaseous at a temperature below the softening point of the spherical particles, the thermoplastic resinous particles being securely adhered to the heat formable synthetic resinous material, heating the thermoplastic resinous material of the first surface to a heat formable temperature sufficiently high to heat plastify the thermoplastic resinous polymeric particles and volatilize the volatile fluid raising agent to expand the particles to a diameter substantially greater than the original diameter while heat forming the composite structure to a desired configuration and maintaining the composite structure as a coherent body.

2. The method of claim 1 wherein the laminate has a second surface of a heat formable synthetic resinous thermoplastic material.

3. The method of claim 1 including the step of providing an adherent matrix within the core and thereby adhering the expanded and unexpanded particles together and to at least the first surface.

4. The method of claim 2 wherein a composite sheet is simultaneously heated from opposite major surfaces.

5. The method of claim 4 wherein the sheets are radiantly heated.

6. The method of claim 1 wherein the body is formed by vacuum forming.

7. A heat formable laminate comprising a first solid surface layer of a synthetic resinous material, a second solid surface layer of a synthetic resinous material, the first and second layers being thermoformable, a central layer comprising a plurality of thermoplastic resinous particles having a generally spherical shape and having encapsulated therein as a distinct and separate phase volatile fluid raising agent which becomes gaseous at a temperature below the softening point of the spherical particles, the thermoplastic resinous particles being securely adhered to the first and second surface layers by means of a thermoplastic resinous matrix, the thermoplastic resinous matrix being present in sufficient quantity that a coherent body is obtained when the central layer is heated to a temperature sufficient to cause the pherical particles to expand.

8. The laminate of claim 7 wherein the expandable particles are expandable microspheres.

9. The laminate of claim 7 wherein first and second surfaces are biaxially oriented polystyrene.

10. The laminate of claim 7 wherein the expandable particles are 70 weight percent methyl methacrylate, 30 weight percent methyl acrylate and the volatile fluid raising agent is neopentane.

11. The laminate of claim 7 wherein the synthetic resinous matrix is a copolymer of styrene and butadiene.

12. A laminate in accordance with claim 7 wherein the core comprises two layers of expandable particles disposed on either side of a generally centrally disposed layer of a solid heat formable synthetic resin.

References Cited

UNITED STATES PATENTS 3,299,914 6/1967 Harmon.
3,386,878 6/1968 Pooley _____ 156—79

ROBERT F. BURNETT, Primary Examiner

WILLIAM J. VAN BALEN, Assistant Examiner

U.S. Cl. X.R.

156—79, 224, 272; 161—162, 402; 206—46; 229—3.5; 264—45, 92